United States Patent
Takata et al.

(10) Patent No.: US 7,136,193 B2
(45) Date of Patent: Nov. 14, 2006

(54) IMAGE PROCESSING TECHNOLOGY PERFORMING DESIGNATED PROCESSING ON NORMAL ORTHOGONALLY TRANSFORMED IMAGES

(75) Inventors: Teruyuki Takata, Nagano-ken (JP); Fumio Nagasaka, Nagano-ken (JP)

(73) Assignee: Seiko Epson Corporation, Shinjuku-ku (JP)

( * ) Notice: Subject to any disclaimer, the term of this patent is extended or adjusted under 35 U.S.C. 154(b) by 0 days.

(21) Appl. No.: 10/960,700

(22) Filed: Oct. 8, 2004

(65) Prior Publication Data
US 2005/0083545 A1    Apr. 21, 2005

Related U.S. Application Data

(63) Continuation of application No. 09/708,020, filed on Nov. 8, 2000, now Pat. No. 6,914,699.

(30) Foreign Application Priority Data
Nov. 15, 1999    (JP)    ................... 11-323946

(51) Int. Cl.
*G06K 1/00* (2006.01)
*H04N 1/405* (2006.01)

(52) U.S. Cl. ............... 358/1.9; 358/3.06; 358/3.13; 382/232; 382/235

(58) Field of Classification Search .......... 358/1.9, 358/2.99, 3.01, 3.06, 3.13; 382/232, 233, 382/235, 248, 250
See application file for complete search history.

(56) References Cited

U.S. PATENT DOCUMENTS

| 5,809,139 | A | 9/1998 | Girod et al. |
| 5,917,952 | A | 6/1999 | Noh |
| 6,671,068 | B1 * | 12/2003 | Chang et al. ............ 358/1.9 |

FOREIGN PATENT DOCUMENTS

| EP | 0 766 468 | 4/1997 |
| JP | 07-057077 | 3/1995 |
| JP | 08205152 A * | 8/1996 |

OTHER PUBLICATIONS

Xiang-Gen Xia, et al., Proceedings of the International Conference on Image Processing 1997, pp. 548-551, XP-010254229, "A Multiresolution Watermark for Digital Images," Oct. 26, 1997.
Kineo Matsui, et al., "Video-Steganography: How to Secretly Embed a Signature in a Picture", IMA Intellectual Property Project Proceedings, vol. 1, XP-008017412, Jan. 1994, pp. 187-206.

(Continued)

*Primary Examiner*—Thomas D. Lee
(74) *Attorney, Agent, or Firm*—Oblon, Spivak, McClelland, Maier & Neustadt, P.C.

(57) ABSTRACT

Noise adding unit 700 reads the downloaded target JPEG image from memory and adds designated noise to that JPEG image. Reverse DCT transformation unit 710 performs reverse discrete cosine transformation on the noise-added JPEG image, and transforms it from space frequency to spatial coordinates. Binarization unit 720 binarizes the image that has been expanded to spatial coordinates.

This makes it possible to achieve the same processing as half-tone processing on images that have undergone normal orthogonal transformation without putting a large burden on the CPU, etc. and with a small data volume even when transferring via a communication path.

4 Claims, 9 Drawing Sheets

OTHER PUBLICATIONS

Milt Leonard, "IC Executes still-Picture Compression Algorithms", Electronic Design, vol. 39, No. 10, XP-000234609, May 23, 1991, pp. 49-50-51-53.

Tsuhan Chien Ed—Institute of Electrical and Electronics Engineers: "Elimination of Subband-Coding Artiects Using the Dithering Technique" Proceedings of the International Conference on Image Processing (ICIP) Austin, Nov. 13-16, 1994, Los Alamitos, IEEE Comp. Soc. Press, US, vol. 3 Conf. 1, Nov. 13, 1994, pp. 874-877, XP010146153, ISBN: 0-8186-6952-7.

Milt Leonard: "IC Executes Still-Picture Compression Algorithms" Electronic Design, Penton Publishing, Cleveland OH, US, vol. 39, No. 10, May 23, 1991, pp. 49-51-53, XP000234609, ISSN: 0013-4872.

Mrusek R., et al.: "Halftoning by Carrier and Spectrum Control" Optics Communication, North-Holland Publishing Co., Amsterdam, NL, vol. 75, No. 5/6, Mar. 15, 1990, pp. 375-380, XP000103614, ISSN: 0030-4018.

* cited by examiner

DCT Coefficient

Fig. 4B

DCT Base Image

IMAGE PROCESSING TECHNOLOGY PERFORMING DESIGNATED PROCESSING ON NORMAL ORTHOGONALLY TRANSFORMED IMAGES

CROSS-REFERENCE TO RELATED APPLICATIONS

This application is a continuation of application Ser. No. 09/708,020, filed on Nov. 8, 2000 now U.S. Pat. No. 6,914,699, the contents of which are incorporated herein by reference.

BACKGROUND OF THE INVENTION

1. Field of the Invention

The present invention relates to image processing technology which performs designated processing on normal orthogonally transformed images such as JPEG (Joint Photographic Experts Group) images.

2. Description of the Related Art

Printers and the like are well known as output devices for things such as images downloaded from a network, images shot using a digital camera, and image created using a computer. Printers print images by forming dots on a print medium using ink, etc., so normally, only two gradations are expressed, dot on or off, for each pixel. Thus, to express the gradation that an image has using dot dispersion, so-called half-tone processing is used on the image to be printed.

Meanwhile, in recent years, most image such as images downloaded from a network or images shot using a digital camera are data compressed images, and most of these are JPEG images. JPEG (Joint Photographic Experts Group) is a still image compression method determined by ISO (International Standardization Organization) and ITU-TS (International Telecommunication Union-Telecommunication Standardization Sector) and used for full color or gray scale, and a key feature is that despite the high level of compression, the decrease in image quality is minimal.

Therefore, for example, when printing a JPEG image downloaded from a network using a printer, it is necessary to use half-tone processing. In such a case, in the past, first the downloaded JPEG image would be expanded on a computer, and then half-tone processing of the expanded image would be done, after which it would be sent to the printer.

Specifically, JPEG images are images that have undergone discrete cosine transformation, so when a JPEG image is expanded, reverse discrete cosine transformation is done on that image, and after expanding to spatial coordinates, half-tone processing is done on that expanded image. As half-tone processing, for example, when using the dither method, a dither matrix is introduced for the organizational dither method, and as a threshold value for each matrix, a comparison is made with the corresponding coordinate point pixel value (pixel concentration), and this is binarized.

However, when the conventional type of method is used, with half-tone processing, in comparison to a huge data volume image being expanded to the spatial coordinates, binarization is done while controlling the coordinate position and corresponding matrix value for each pixel successively, leading to the problem of an excessive burden being placed on the CPU, and processing time being very long.

Also, by performing half-tone processing, the image data volume is again increased, and to print using the printer, when a print control command is added to that image, the data volume increases yet again. Therefore, for example, when the printer is connected to a computer via a network or a public line, etc., it is necessary to send this huge data volume image to the printer from the computer via a network or public line, which causes the problem of having the communication time being long, and leading to traffic problems.

SUMMARY OF THE INVENTION

Therefore, the purpose of the present invention is to solve the aforementioned problems of the prior art, providing image processing technology that does not increase the burden on the CPU, and that can perform an equivalent process to half-tone processing on a normal orthogonally transformed image, and can transfer this via a communication path with minimal data volume.

To achieve at least part of the aforementioned purpose, a first image processing apparatus of the present invention is an apparatus that performs designated processes on a normal orthogonally transformed image. The apparatus includes: a noise adding unit that adds designated noise to the image that has undergone the normal orthogonal transformation, wherein the noise is noise obtained by performing the same transformation as the normal orthogonal transformation on a designated dither matrix.

In this way, with the first image processing apparatus, the noise adding unit adds designated noise to a normal orthogonally transformed image, after which reverse normal orthogonal transformation which is a reverse transformation of the aforementioned normal orthogonal transformation is performed on the image, and by binarizing using a designated threshold value, it is possible to realize half-tone processing of about the same level as that of dispersed dither.

Also, for the first image processing apparatus, by adding noise to the normal orthogonally transformed image, noise is added to the space frequency without expanding the image to the spatial coordinates, so the process for the noise adding unit can be a simple one, and therefore even if the noise adding unit is realized using the CPU, for example, the burden on the CPU is very light, and processing time is also short. Also, because of this, it is sufficient to use a CPU with a low processing capacity. Also, even when dedicated hardware is used as the noise adding unit instead of a CPU, it is easy to make that hardware.

Also, with the first image processing apparatus, even when transferring a noise-added image to another apparatus via a communication path, the image itself is an image that has undergone normal orthogonal transformation, so the data volume of the image is relatively low, and therefore communication time can be very short, and even data paths with low data capacity are sufficient to handle such images.

As noise, by adding this kind of noise obtained from a dither matrix, it is possible to improve the quality of the finally obtained image. Also, by suitably changing the amplitude or frequency components, etc. of the noise added to the image, it is possible to control the image quality, but as described above, by using noise obtained from a previously known dither matrix as the noise, it is possible to perform this kind of image quality control more accurately and more easily.

For the first image processing apparatus of the present invention, it is preferable that the matrix is a Bayer matrix.

This is because the Bayer matrix is a typical items used as the dither matrix used for half-tone processing.

For the first image processing apparatus of the present invention, it is preferable that the normal orthogonal transformation is discrete cosine transformation.

This is because discrete cosine transformation is widely used as a method for which high efficiency image encoding is possible, and is a normal orthogonal transformation suitable for image processing.

For the first image processing apparatus of the present invention, the image that has undergone the normal orthogonal transformation is preferably a JPEG image.

A JPEG image is a data compressed image, and is an image widely used for such things as internet home pages, digital cameras, and color facsimiles, because there is a strong demand for image processing by users. This is also because JPEG image expansion methods are established, and these methods can be used easily even when expanding noise-added JPEG images.

The first image processing apparatus of the present invention can also include a reverse transformation unit that performs a reverse normal orthogonal transformation, which is a reverse transformation of the normal orthogonal transformation, on the noise-added image. The apparatus can further include a binarization unit that binarizes the image that has undergone the reverse normal orthogonal transformation using a designated threshold value.

For some noise adding unit, to make a final half-tone processed image of a noise-added image, it is preferable to use a reverse transformation unit to perform a reverse normal orthogonal transformation on the noise-added image and to use a binarization unit to binarize the image that has undergone reverse normal orthogonal transformation using designated threshold values. This kind of reveres transformation unit and binarization unit can be a separate apparatus from the image processing apparatus equipped with the noise adding unit, for example, but as described above, they can also be equipped on the same image processing apparatus. In this way, when equipped on the same image processing apparatus, all the half-tone processing can be completed and a half-tone processed image can be obtained using this image processing apparatus alone.

For the first image processing apparatus of the present invention which further includes the aforementioned binarization unit, said designated threshold value can be a certain value.

By binarizing using a certain threshold value in this way, the binarization process itself can be done easily.

The first image processing apparatus of the present invention preferably further includes an output unit that outputs said binarized image by display or printing.

By equipping the image processing apparatus with this kind of unit, it is possible to suitably provide a half-tone processed image to the user.

A second image processing apparatus of the present invention is an apparatus that performs designated processing on an image for which high frequency components have been removed. The apparatus includes: a noise adding unit that adds designated noise to the image with said high frequency components removed.

For data compressed images such as JPEG images, normally, to compress data, high frequency components that the human eye is not very sensitive to are removed. Thus, by adding designated noise to an image with this kind of high frequency component removed, if the aforementioned reverse normal orthogonal transformation or binarization processing is done on the image thereafter, it is possible to realize half-tone processing like that described previously.

For the second image processing apparatus of the present invention, said noise is preferably noise obtained by performing normal orthogonal transformation on the designated dither matrix.

By using this kind of noise obtained from a dither matrix as the noise, it is possible to improve the quality of the finally obtained image, and to more precisely and easily control image quality.

An image processing system of the present invention is a system that can transfer images from a sending device to a receiving device. The sending device includes: a noise adding unit that adds designated noise to an image which has undergone normal orthogonal transformation; and a sending unit that sends the image to which the noise has been added via a communication path. The receiving device includes: a receiving unit for receiving the sent image; and a reverse transformation unit for performing reverse normal orthogonal transformation, which is a reverse transformation of the normal orthogonal transformation, on the received image.

Also, for the image processing system of the present invention, the receiving device preferably further includes a binarization unit that binarizes the image that underwent the reverse normal orthogonal transformation using a designated threshold value.

In this way, with the image processing system of the present invention, for the sending device, the noise adding unit adds designated noise to the normal orthogonally transformed image, and the sending unit sends that image via a communication path, while for the receiving device, the receiving unit receives that sent image, the reverse transformation unit performs reverse normal orthogonal transformation of the image, and the binarization unit binarizes the image using a designated threshold value. By doing this kind of processing, it is possible to realize the same level of half-tone processing as with dispersed dither.

Also, for the image processing system of the present invention, for the sending device, it is possible to achieve the same level of results as the first image processing apparatus described previously. Also, for the receiving device, halftone processing is completed simply by performing reverse normal orthogonal transformation and binarization with a designated threshold value on the image sent from the sending device (in other words, a noise-added image), so the processing time for half-tone processing is short. Also, even if the reverse transformation unit or binarization unit are realized using a CPU, for example, performing the image reverse transformation and binarization themselves does not add a burden to the CPU.

Furthermore, with the image processing system of the present invention, the image that is transferred to the receiving device via a communication path from the sending device is an image left with normal orthogonal transformation as is, so the data volume of the image is relatively small, and therefore communication time is very short, and even if the communication path data capacity is small, it would be sufficient to handle such images.

For the image processing system of the present invention, the receiving device preferably further includes an output unit that outputs the binarized images by display or printing.

By the receiving device including such a unit, the user of the receiving device can easily fetch the transferred half-tone processed images.

The memory device of the present invention is a memory device that can be connected to the first image processing apparatus. The memory device includes: a first memory unit that stores the image that has undergone the normal orthogonal transformation; and a second memory unit that stores the dither matrix or stores noise obtained by performing the same transformation as the normal orthogonal transformation on the dither matrix.

In this way, with the memory device of the present invention, the first memory unit stores the normal orthogonally transformed image, and the second memory unit stores a dither matrix or stores noise obtained by performing the same transformation as normal orthogonal transformation on the dither matrix.

Therefore, with the memory device of the present invention, by storing the dither matrix used when adding noise or the noise itself in the memory device for storing images, it is possible to easily add noise to an image without preparing a dither matrix or noise on the image processing apparatus.

The image processing method of the present invention is a method that performs designated processing on a normal orthogonally transformed image. The method includes the step of: (a) adding designated noise to the image that has undergone the normal orthogonal transformation, wherein the noise is noise obtained by performing the same transformation as the normal orthogonal transformation on a designated dither matrix.

By equipping the method with this kind of step (a), it is possible to achieve the same results as with the first image processing apparatus described above.

As noise, by using this kind of noise obtained from a dither matrix, it is possible to improve the quality of the finally obtained image and to more precisely and easily control image quality.

The image processing method of the present invention preferably also includes the step of: (b) performing reverse normal orthogonal transformation, which is a reverse transformation of the normal orthogonal transformation, on the image with the noise added. The method preferably further includes the step of: (c) binarizing the image, which has undergone the reverse normal orthogonal transformation, using a designated threshold value.

By including these kinds of steps (b) and (c), it is possible to realize half-tone processing.

The computer program product of the present invention is a product that causes a computer to perform designated processes on a normal orthogonally transformed image. The product includes: a first program code that causes the computer to add noise obtained by performing the same transformation as the normal orthogonal transformation on a designated dither matrix to the image that has undergone the normal orthogonal transformation; and a computer readable medium, in which the first program code is stored.

When the aforementioned type of computer program is run by a computer, it is possible to realize the same function as the noise adding unit for the aforementioned first image processing apparatus of the present invention, so it is possible to achieve the same results as the aforementioned first image processing apparatus.

For the computer program product of the present invention, the noise is preferably noise obtained by performing the same transformation as the normal orthogonal transformation on a designated dither matrix.

As noise, by using this kind of noise obtained from a dither matrix, it is possible to improve the quality of the finally obtained image and to more precisely and easily control image quality.

The computer program product of the present invention preferably also includes a second program code that causes the computer to perform a reverse normal orthogonal transformation, which is a reverse transformation of the normal orthogonal transformation, on the noise-added image, the second code being stored in the computer readable medium. The product preferably further includes a third program code that causes the computer to binarize the image, which has undergone the reverse normal orthogonal transformation, using a designated threshold value, the third program being stored in the computer readable medium.

When such a computer program is run by a computer, it is possible to realize the same functions as the aforementioned reverse transformation unit and binarization unit of the first image processing apparatus of the present invention, so it is possible to achieve the same results as the aforementioned first image processing apparatus.

The computer readable medium of the present invention is a medium stores an image which is obtained by adding designated noise to a normal orthogonally transformed image.

By having the computer read the aforementioned images from such a medium and by performing the aforementioned reverse normal orthogonal transformation and binarization processing, it is easy to obtain half-tone processed images.

For the present invention, it is also possible to use another form as noted below. In other words, that form further includes a multi-value unit that multi-values an image that undergoes reverse normal orthogonal transformation using the reverse transformation unit using two or more different threshold values. With this form, it is possible to obtain a half-tone processed multi-value image.

DESCRIPTION OF THE PREFERRED EMBODIMENTS

(1) Structure of the First Preferred Embodiment

Figure 1:
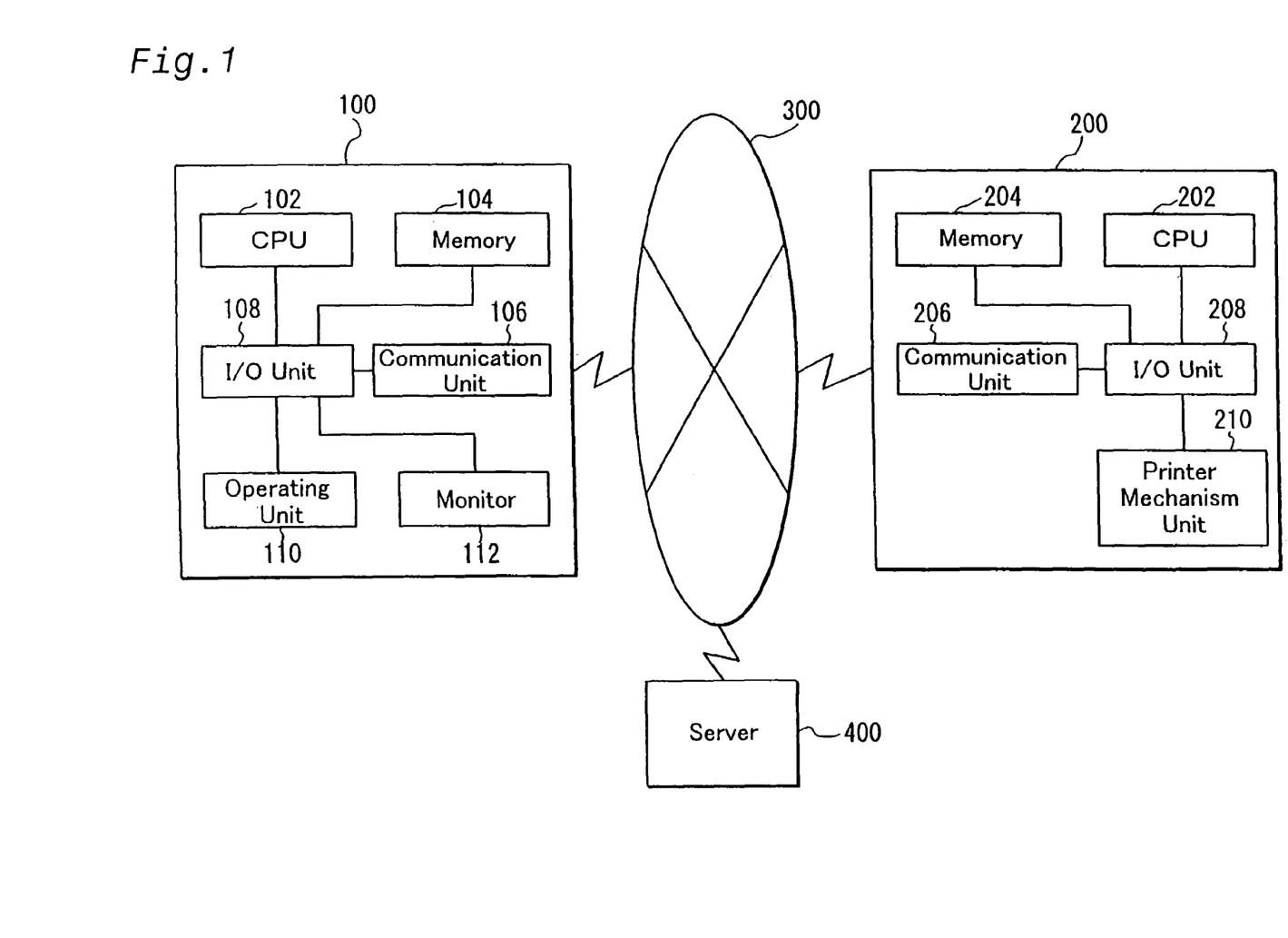
FIG. 1 is a block diagram that shows the summary structure of the image processing apparatus and image processing system as a first preferred embodiment of the present invention.

Following, we will explain a preferred aspect of the present invention based on a preferred embodiment. FIG. 1 is a block diagram showing the summary structure of an image processing apparatus and an image processing system as a first preferred embodiment of the present invention.

Computer 100 constitutes the image processing apparatus of the present invention, and together with printer 200 constitutes the image processing system of the present invention. This computer 100 and printer 200 are connected to each other via network 300, and server 400 is also connected to network 300.

Computer 100 can be, for example, a portable information terminal such as a mobile computer, PDA, or multi-function portable telephone, and equipped within this are CPU 102 for performing various processes and controls according to a computer program, memory 104 for recording the aforementioned computer program and for temporarily recording things such as data obtained during processing, I/O unit 108 for performing exchange of things such as data between CPU 102 and other structural elements, operating unit 110 for input of instructions, etc. from the user, monitor 112 for displaying images, etc., and communication unit 106 for performing sending and receiving of things such as data with other devices such as printer 200 via network 300.

Meanwhile, within printer 200 is provided CPU 202 for performing various processes and controls according to a computer program, memory 204 for recording the aforementioned computer program and for temporarily recording things such as data obtained during processing, I/O unit 208 for performing exchange of things such as data between CPU 202 and other structural elements, printer mechanism unit 210 for printing images, etc. on printer paper, and communication unit 206 for performing sending and receiving of things such as data with other devices such as computer 100 via network 300.

Also, within server 400 are stored various images including JPEG images, and these are published on network 300.

For network 300, it is possible to use various networks regardless of whether they require wires or are wireless, including the internet, local area networks, or dedicated networks.

(2) Operation of the First Preferred Embodiment

Figure 2:
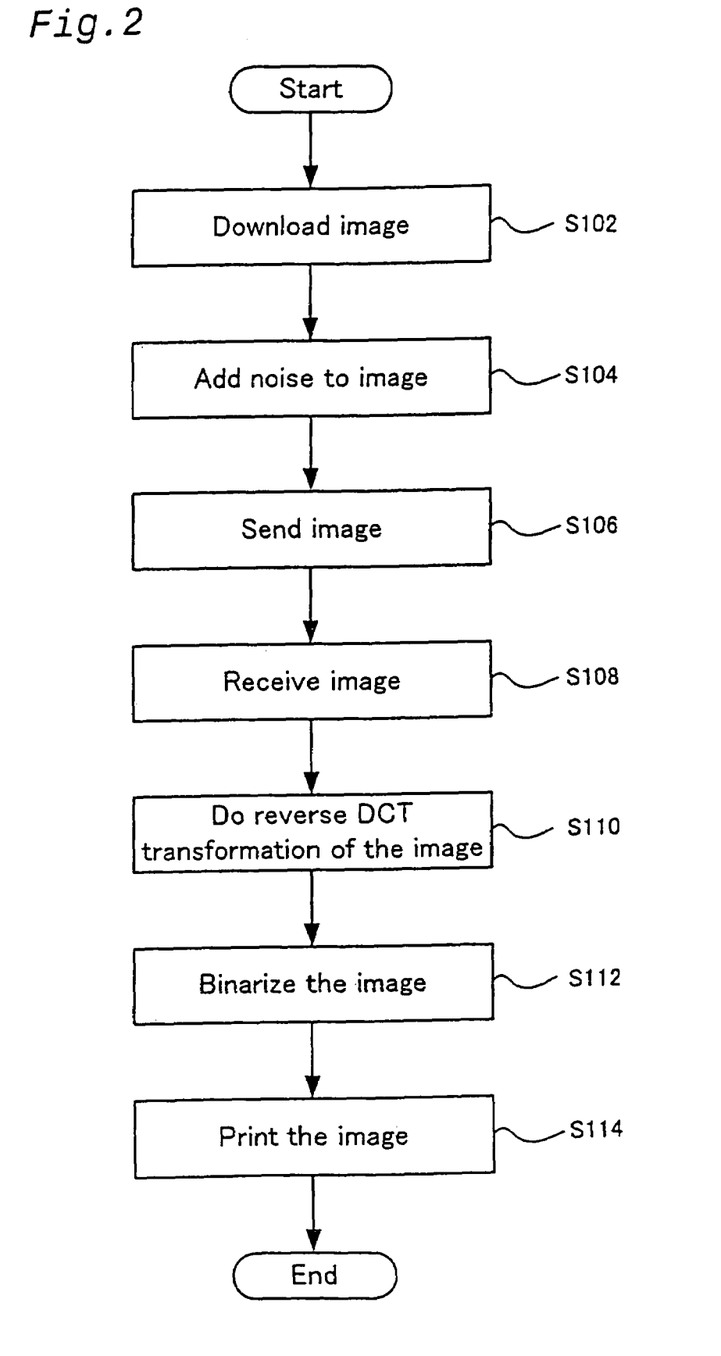
FIG. 2 is a flow chart showing the process flow for the image processing system of FIG. 1.

Now we will explain the operation of this preferred embodiment. FIG. 2 is a flow chart that shows the flow of processes for the image processing system of FIG. 1.

In FIG. 1, when the user of computer 100 gives instructions to download a desired JPEG image from server 400 via operating unit 110, CPU 102 controls communication unit 106 according to those instructions and accesses server 400 via network 300, downloads the target JPEG image stored in server 400 (step S102 in FIG. 2), and stores this in memory 104.

As described previously, JPEG images are data compressed images, and undergo discrete cosine transformation. Here, we will explain discrete cosine transformation (DCT: Discrete Cosine Transform).

Discrete cosine transformation is an expanded even function of a Fourier transformation, and is a transformation that represents any cycle function as a sum of a cosine function. One dimensional discrete cosine transformation and reverse discrete cosine transformation are shown by the following equation (1) with F(m) as the transformed components for the frequency components.

$$F(m) = \sqrt{\frac{2}{N}} k_m \sum_{n=0}^{N-1} f(n) \cos\left\{\frac{(2n+1)m\pi}{2N}\right\} \quad m = 0, 1, 2, \ldots, N-1 \quad (1)$$

$$\text{However, } k_j = \begin{cases} 1 & (J = 0, N) \\ \frac{1}{\sqrt{2}} & (J = 1, 2, \ldots N-1) \end{cases}$$

Also, reverse transformation is shown by the following equation (2).

$$f(n) = \sqrt{\frac{2}{N}} \sum_{m=0}^{N-1} k_m F(m) \cos\left\{\frac{(2n+1)m\pi}{2N}\right\} \quad n = 0, 1, 2, \ldots, N-1 \quad (2)$$

From equations (1) and (2), when the sampling count is N, the calculation volume for discrete cosine transformation and reverse discrete cosine transformation is $O(N^2)$. However, the same kind of high speed algorithm as for Fourier transformation has been developed for discrete cosine transformation, and when the sampling count N is a multiple of 8, we can see that the calculation volume can be reduced to $O(N\log N)$.

It is also possible to calculate multi-dimensional discrete cosine transformations as repeated one-dimensional discrete cosine transformations. Similarly, it is possible to calculate multi-dimensional reverse discrete cosine transformations as repeated one-dimensional reverse discrete cosine transformations.

Figure 3:
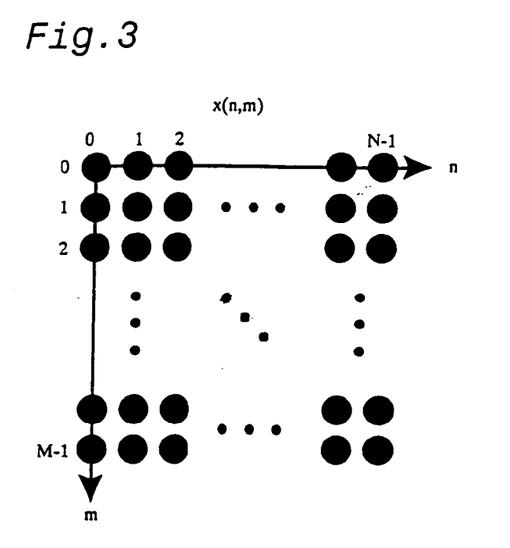
FIG. 3 is an explanatory figure showing the two dimensional signal x(n, m) having N×M pixels.

For example, the two-dimensional discrete cosine transformation used for image analysis is as follows. Now, we will consider discrete cosine transformation in relation to the two-dimensional signal x(n, m) having N×M pixels like that shown in FIG. 3. At this time, the two-dimensional discrete cosine transformation is shown by equation (3) below. However, F(n, m) is a component transformed by discrete cosine transformation to space frequency.

$$F(n, m) = \frac{2 k_n k_m}{\sqrt{NM}} \sum_{n_1=0}^{N-1} \sum_{m_1=0}^{M-1} x(n_1, m_1) \cos\left(\frac{(2n_1+1)n\pi}{2N}\right) \cos\left(\frac{(2m_1+1)m\pi}{2M}\right) \quad (3)$$

$$\text{However, } k_j = \begin{cases} 1 & (J = 0, N) \\ \frac{1}{\sqrt{2}} & (J = 1, 2, \ldots N-1) \end{cases}$$

Also, the reverse transformation is shown by equation (4) below.

$$x(n, m) = \frac{2}{\sqrt{NM}} \sum_{n_1}^{N-1} \sum_{m_1}^{M-1} k_{n_1} k_{m_1} F(n_1, m_1) \cos\left(\frac{(2n_1+1)n_1\pi}{2N}\right) \cos\left(\frac{(2m_1+1)m_1\pi}{2M}\right) \quad (4)$$

When the transformation equation for two-dimensional discrete cosine transformation and the transformation equation for one-dimensional discrete cosine transformation are compared, we can see that the only difference is the fact that the product of the constant of the one-dimensional discrete cosine transformation is taken and the cosine is used twice. Therefore, by changing the transformation equation of the two dimensional discrete cosine transformation, it is possible to return to the one-dimensional discrete cosine transformation.

The transformation equation of the two-dimensional discrete cosine transformation is changed as follows.

$$x(n, m) = \frac{2}{\sqrt{NM}} \quad (5)$$

$$\sum_{n_1}^{N-1} \sum_{m_1}^{M-1} k_{n_1} k_{m_1} F(n_1, m_1) \cos\left(\frac{(2n+1)n_1\pi}{2N}\right) \cos\left(\frac{(2m+1)m_1\pi}{2M}\right)$$

$$\text{However, } k_j = \begin{cases} 1 & (J = 0, N) \\ \frac{1}{\sqrt{2}} & (J = 1, 2, \ldots N - 1) \end{cases}$$

Figure 4A:
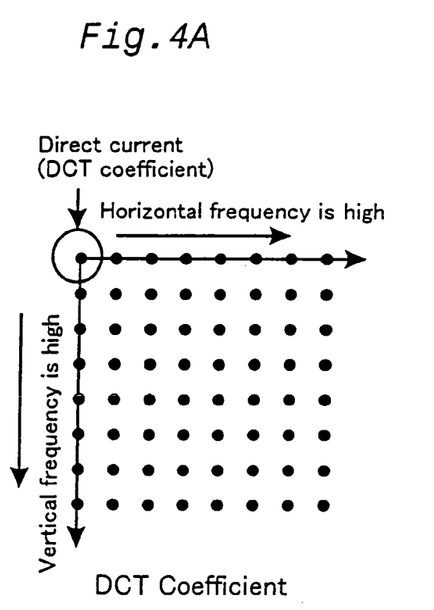
FIG. 4A is an explanatory figure showing the DCT coefficient for two dimensional discrete cosine transformation.
Figure 4B:
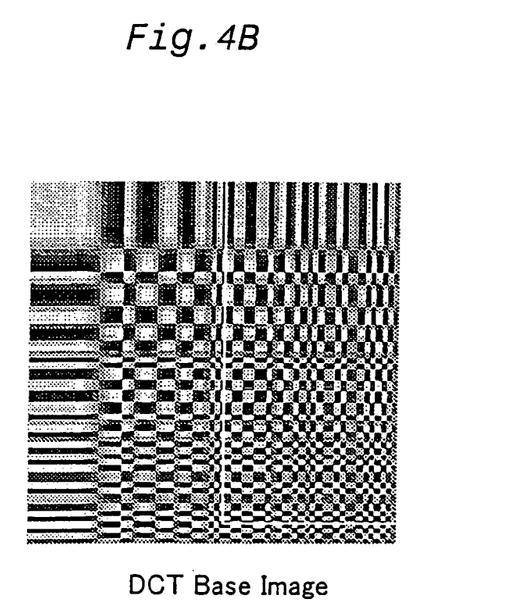
FIG. 4B is an explanatory figure showing the base image for two dimensional discrete cosine transformation.

FIG. 4A is an explanatory figure showing the DCT coefficient for two dimensional discrete cosine transformation. FIG. 4B is an explanatory figure showing the base image for two dimensional discrete cosine transformation. With FIG. 4, N=8, and M=8. FIG. 4A represents DCT coefficient X(u, v) and FIG. 4B represents the base image.

As shown in FIG. 4A, by transforming to a space frequency component using discrete cosine transformation for an 8×8 area, 8×8 DCT coefficients can be obtained. This 8×8 DCT coefficients have the following meaning.

Specifically, the upper left component X(0, 0) of the DCT coefficient is called the DC coefficient (direct current component), and has a special role that differs from the other 63 coefficients. For example, when in the 8×8 area the pixel values before transformation were all the same value, for the components transformed to the space frequency component using discrete cosine transformation, only the direct current component has a certain value, and the other alternating current components all have a value of 0. In other words, the DC coefficient represents the average integral multiple (with 8×8, the 8 times the average) of the pixel value within the operating grid (in this case, 8×8). Also, the other 63 coefficients are called 0alternating current components, and represent the varied portion of the pixel value.

The gray scale image shown in FIG. 4B is a pixel that represents what is described above. When a one to one correspondence is made with the DCT coefficient shown in FIG. 4A, there is one varied portion in the area corresponding to the upper left DC coefficient. Also, as we move from left to right, it is shown that there is a gradual increase in the horizontal direction horizontal frequency component, and similarly as we go from top to bottom there is an increase in the vertical frequency component, so the lower right component shows the highest component for both horizontal and vertical components.

Generally, when a photographic image such as a nature scene undergoes two-dimensional discrete cosine transformation, the DC coefficient X(0, 0) becomes greatest, and for the alternating current component, the value tends to become smaller as the DCT coefficient X(u, v) relates to high frequency (u, v large).

Also, FIG. 4B shows a discrete cosine transformation base image for an 8×8 matrix, but by performing discrete cosine transformation for a wider area (16×16, 32×32, etc.), it is possible to represent higher frequency compone0ts.

Using discrete cosine transformation as described above, images that are transformed from spatial coordinates to space frequency components then undergo quantization after which they undergo Huffman encoding and data compression.

With the quantization process, the following kind of process is performed. Specifically, human vision characteristics are very sensitive in low frequency areas, but not very sensitive in high frequency areas. Therefore, most quantization bits are allocated to low frequency components, and few quantization bits are allocated to high frequency components, making it possible to reduce the total information volume. This operation divides the DCT coefficient value by some value to make it smaller, and restores it during decoding, and this operation is called "quantization". Using this quantization, degradation of the image occurs with the restored image, but by suitably defining the quantization table, it is possible to make it difficult to notice the image degradation.

Meanwhile, with the Huffman encoding process, the following process is performed. Specifically, with Huffman encoding, redundant bits from quantization data are reduced. Huffman encoding uses a different method for DC components and AC components. DC components are an integral multiple of the average value of the pixel values within the MCU (an MCU is a gathering of 8×8 blocks obtained from 8×8 pixel partial images sampled from a source image), and since there is not a very big difference for DC coefficients between adjacent MCUs, for DC coefficients, the difference with the DC component of the previous MCU is encoded. For AC components, using the fact that high frequency components are almost all 0, encoding is done by scanning in a zigzag within the MCU to show consecutive 0s as much as possible.

Images with data compressed by a procedure such as that described above is a normal JPEG image.

Now, going back to FIG. 1, next, the user wants to print a downloaded JPEG image to remote printer 200 via network 300, and when the user gives those instructions via operating unit 110, CPU 102 performs a process such as the following on that JPEG image.

Figure 5:
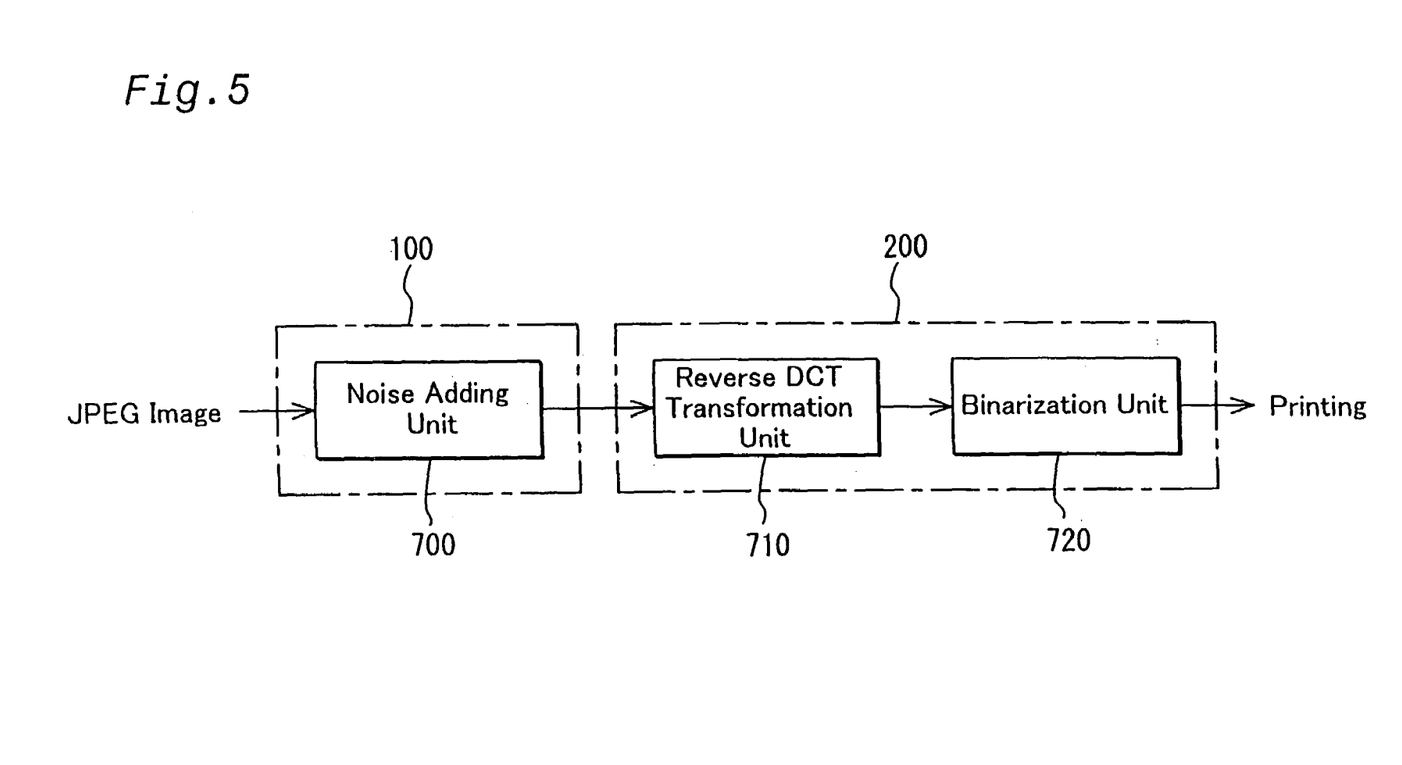
FIG. 5 is a block diagram showing an image processing block equipped with the computer 100 and printer 200 of FIG. 1.

FIG. 5 is a block diagram showing an image processing block equipped with computer 100 and printer 200 of FIG. 1. As shown in FIG. 5, computer 100 is equipped with noise adding unit 700, and printer 200 is equipped with reverse DCT transformation unit 710 and binarization unit 720. Of these, noise adding unit 700 is realized by CPU 102 functioning according to the computer program recorded in memory 104, and reverse DCT transformation unit 710 and binarization unit 720 are realized by CPU 202 functioning according to the computer program recorded in memory 204.

Noise adding unit 700 that functions according to CPU 102 reads a downloaded target JPEG image from memory 104 and adds designated noise to that JPEG image (step S104).

Figure 6:
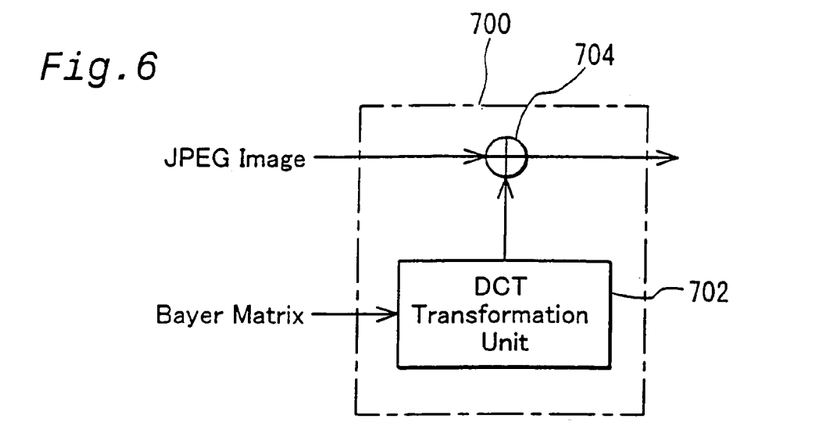
FIG. 6 is a block diagram showing a specific example of the noise adding unit 700 of FIG. 5.

FIG. 6 is a block diagram showing a specific example of noise adding unit 700 shown in FIG. 5. As shown in FIG. 6, with this specific example, noise adding unit 700 is formed from DCT transformation unit 702 and adding unit 704.

Specifically, as described above, noise adding unit 700 reads the target JPEG image from memory 104, and reads the Bayer matrix that is one of the dither matrixes for the organizational dither method. Then, the DCT transformation unit 702 within noise adding unit 700 performs discrete cosine transformation on the read Bayer matrix, and obtains noise. Adding unit 704 adds the noise obtained from DCT transformation unit 702 to the read JPEG image.

Also, the Bayer matrix is stored in memory 104 in advance. The Bayer matrix can be derived recursively from equation (6) below.

$$D_n = \begin{pmatrix} 4D_n & 4D_n + 2U_n \\ 4D_n + 3U_n & 4D_n + U_n \end{pmatrix} \quad (6)$$

However, $$D_2 = \begin{pmatrix} 0 & 2 \\ 3 & 1 \end{pmatrix},$$

and for Un, all elements are 1 (n×n) matrix.

For example, an (8×8) Bayer matrix would be as shown in equation (7).

$$D_8 = \begin{pmatrix} 0 & 32 & 8 & 40 & 2 & 34 & 10 & 42 \\ 48 & 16 & 56 & 24 & 50 & 18 & 58 & 26 \\ 12 & 44 & 4 & 36 & 14 & 46 & 6 & 38 \\ 60 & 28 & 52 & 20 & 62 & 30 & 54 & 22 \\ 3 & 35 & 11 & 43 & 1 & 33 & 9 & 41 \\ 51 & 19 & 59 & 27 & 49 & 17 & 57 & 25 \\ 15 & 47 & 7 & 39 & 13 & 45 & 5 & 37 \\ 63 & 31 & 55 & 23 & 61 & 29 & 53 & 21 \end{pmatrix} \quad (7)$$

However, when this type of Bayer matrix is transformed to a space frequency component by DCT transformation unit 702 using discrete cosine transformation, not just high frequency components but also low frequency components appear. Therefore, when adding noise to a JPEG image at adding unit 704, noise is added not only to the JPEG image high frequency side (specifically the right side and bottom of FIG. 4A), but noise is also added to the low frequency side (the left side and top of FIG. 4A).

Having performed the above, when noise is added to a JPEG image by noise adding unit 700, next, CPU 102 controls communication unit 106 and accesses printer 200 via network 300, and sends the noise-added JPEG image to printer 200 (step S106).

When a noise-added JPEG image is sent in this way, CPU 202 for printer 200 controls communication unit 206 and receives this image. (step S108) and stores it in memory 204.

Reverse DCT transformation unit 710 that functions according to CPU 202 reads the received JPEG image from memory 204 and performs reverse discrete cosine transformation on the noise-added JPEG image (step S110). As a result, the noise-added JPEG image is transformed from space frequency to spatial coordinates.

Next, binarization unit 720 which functions according to CPU 202 binarizes the image that has been expanded to spatial coordinates (step S112). Specifically, binarization unit 720 reads the set threshold value that was prepared in advance in memory 204 and sequentially compares that set threshold value with each pixel value of the expanded image, and binarizes these. As a result, a half-tone processed image is obtained.

Next, CPU 202 controls printer mechanism unit 210 and prints the desired half-tone processed image onto printing paper (step S114).

As described above, for this preferred embodiment, noise is added to a JPEG image at computer 100, and at printer 200, by performing reverse discrete cosine transformation on the noise-added JPEG image and binarizing using a set threshold value, it is possible to realize half-tone processing of the same level as dispersed dither.

Also, at computer 100, noise is added to space frequency without expanding the JPEG image to spatial coordinates, so as processing by CPU 102, it is in fact enough to simply repeat the same kind of value adding on the space frequency component, and therefore, there is a very light burden on CPU 102 for computer 100, and the processing time is short. Also, because of this, it is possible to sufficiently handle the tasks using a low processing capacity CPU for CPU 102. It is also not necessary to prepare a complex processing program. Furthermore, even when using dedicated hardware instead of CPU 102, making this hardware is easy.

Meanwhile, at printer 200, with the same kind of method as a normal method for expanding a JPEG image, JPEG images sent from computer 100 (specifically noise-added JPEG images) are expanded and binarized using a set threshold value, and this is enough to complete the half-tone processing, so the half-tone processing time is short. Also, the JPEG image expansion itself does not put much burden on CPU 202, and binarization itself also is simply a comparison of the image values with a set threshold value, so there is no need to control things such as coordinate positions, and this also lightens the burden on CPU 202 and shortens the processing time. Also, the JPEG image expansion process itself is an already established process, and there are existing general purpose processing modules that can be used for this.

Furthermore, with this preferred embodiment, the image transferred from computer 100 to printer 200 via network 300 is not an expanded image but rather a compressed image, so the image data volume is very small, and therefore the communication time is very short, and even if the data capacity of a midway communication path is small, the data can be handled sufficiently.

With the explanation above, we did not specifically discuss color space transformation, but JPEG images are images transformed from RGB color space to $YC_bC_r$ color space, so the actual processing is performed as follows. Here, R is the red component, G is the green component, and B is the blue component, while Y is the yellow component, and $C_b$ and $C_r$ are the difference between the B component, R component, and Y component, and are color difference components.

Specifically, the aforementioned noise adding and reverse discrete cosine transformation processes are done for each Y component, $C_b$ component, and $C_r$ component. Then, after the reverse discrete cosine transformation is performed, the Y component, $C_b$ component, and $C_r$ component are transformed to an R component, B component, and G component (in other words, transformed from $YC_bC_r$ color space to RGB color space), and the binarization process is performed on each of the R component, G component, and B component.

(3) Another Specific Example of the Noise Adding Unit

Figure 7:
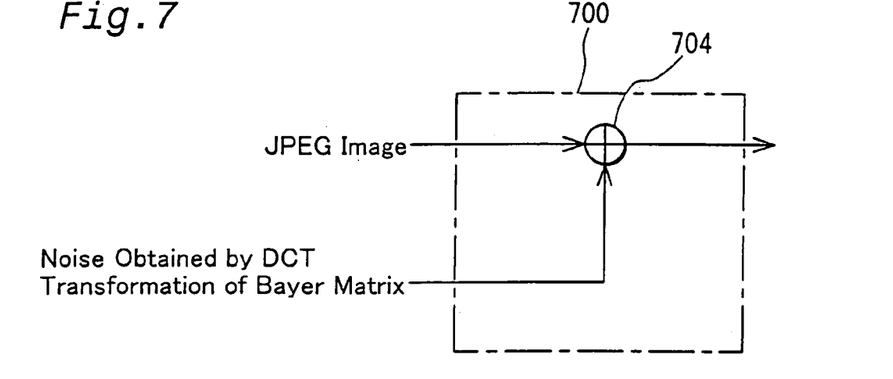
FIG. 7 is a block diagram showing another specific example of noise adding unit 700 of FIG. 5.

In the specific example shown in FIG. 6 of the noise adding unit 700, to obtain noise from the Bayer matrix, DCT transformation unit 702 was used, but the following kind of structure can also be used. FIG. 7 is a block diagram that shows another specific example of the noise adding unit 700 of FIG. 5. As shown in FIG. 7, with this specific example, noise adding unit 700 is composed only of adding unit 704.

In other words, with this specific example, noise obtained by discrete cosine transformation of the Bayer matrix is stored in memory 104 in advance. Then, noise adding unit 700 reads the target JPEG image from memory 104 and as described above, reads the stored noise, and similarly, adding unit 704 adds the read noise to the read JPEG image.

In this way, by storing noise obtained by discrete cosine transformation of the Bayer matrix in memory 104 in advance, it is not necessary to perform discrete cosine transformation at noise adding unit 700, so the process is that much simpler.

In the specific examples shown in FIGS. 6 and 7, a Bayer matrix was used as the dither matrix for the organizational dither method, but the present invention is not limited to this, and for example, it is also possible to use another dither matrix such as a spiral matrix or a dot matrix.

Also, in the specific examples shown in FIGS. 6 and 7, as noise, noise obtained by performing discrete cosine transformation on a dither matrix for an organizational dither method was used, but the present invention is not limited to this, and other noise can also be used.

Figure 8:
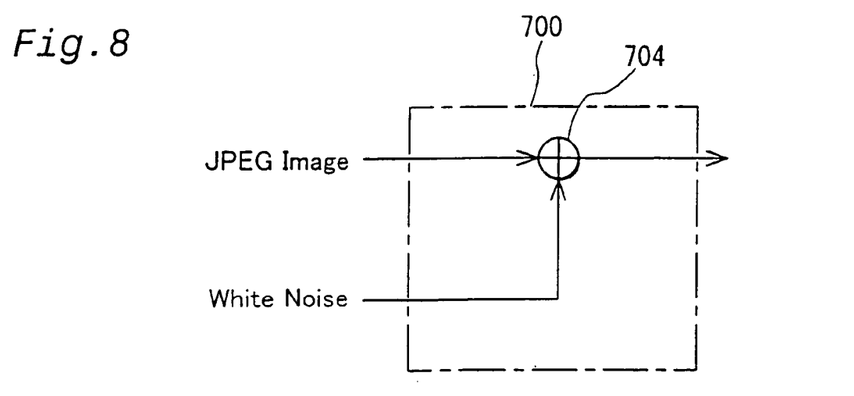
FIG. 8 is a block diagram showing another specific example of noise adding unit 700 of FIG. 5.

FIG. 8 is a block diagram showing another specific example of the noise adding unit 700 of FIG. 5. As shown in FIG. 8, with this specific example as well, noise adding unit 700 is formed only from adding unit 704.

Specifically, with this specific example, white noise is stored in advance in memory 104. Then, noise adding unit 700 reads the target JPEG image from memory 104, and at the same time reads the stored noise, and at adding unit 704, the read white noise is added to the read JPEG image. At this time, it is more effective if the white noise is added to the high frequency area of the JPEG image.

Figure 9:
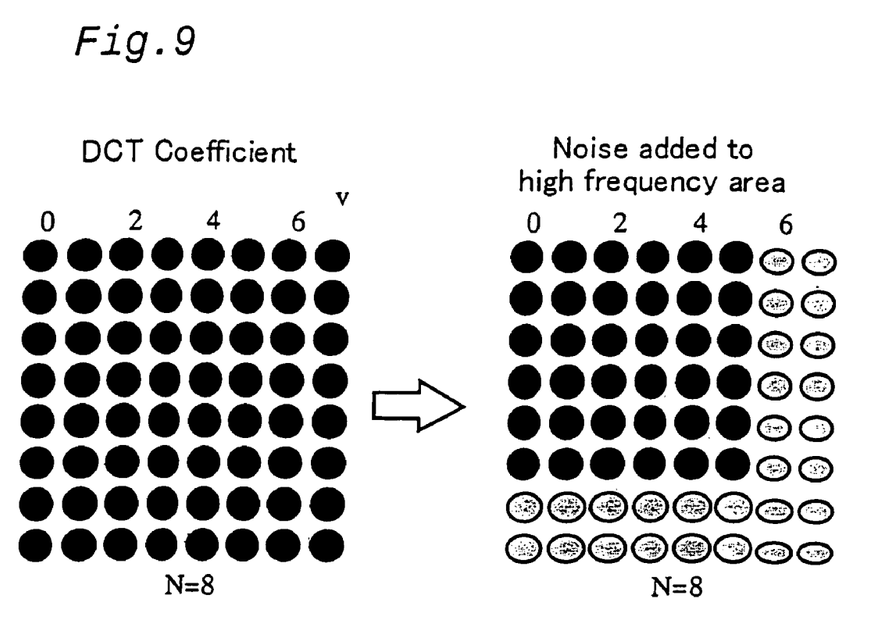
FIG. 9 is an explanatory figure showing the state of an image that has undergone discrete cosine transformation with white noise added to the high frequency area.

FIG. 9 is an explanatory figure showing the state when white noise is added to the high frequency area of an image that has undergone discrete cosine transformation. In this case, only the low frequency side (6×6) pixel data for an (8×8) pixel area is used, and after higher frequency components than this are removed, white noise is added.

When white noise is added to a JPEG image in this way as well, it is possible to achieve the same effect as when adding noise obtained by performing discrete cosine transformation on a dither matrix. However, in terms of the quality of the finally obtained printed image, in most cases the quality will be lower than when adding noise obtained by performing discrete cosine transformation on a dither matrix. However, since all that is required is simply adding white noise, processing is easy.

(4) Variation Example

Figure 10A:
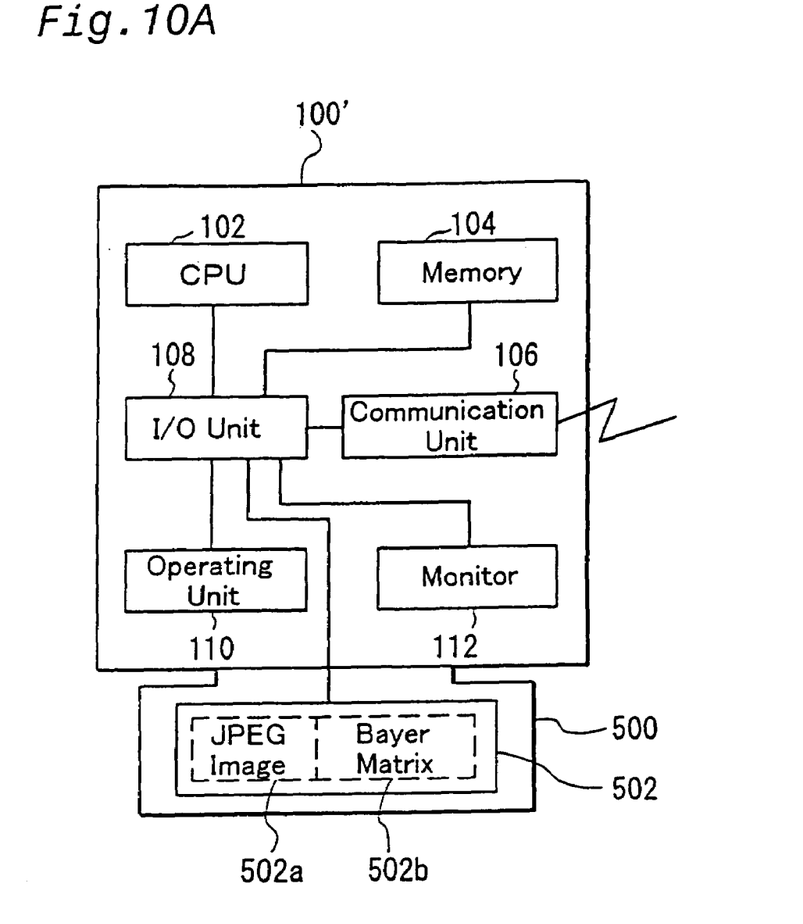
FIG. 10A is a block diagram showing a variation of the image processing apparatus shown in FIG. 1.
Figure 10B:
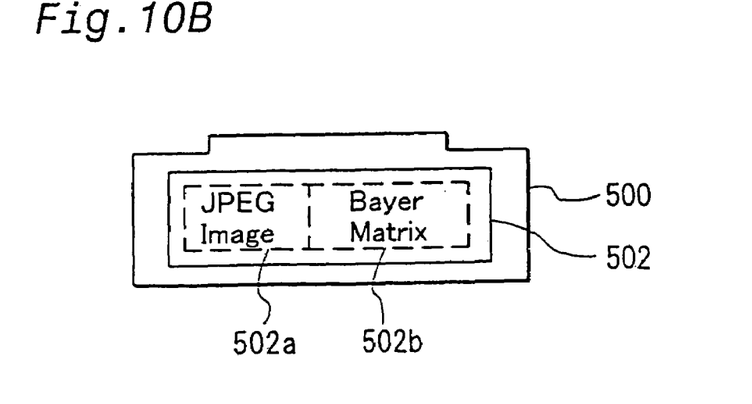
FIG. 10B is a block diagram showing a memory device that can be connected to the image processing apparatus shown in FIG. 10A.

FIG. 10A is a block diagram showing a variation of the image processing apparatus shown in FIG. 1. FIG. 10B is a block diagram showing a memory device that can be connected to the image processing apparatus shown in FIG. 10A.

Computer 100' shown in FIG. 10A is a variation example of computer 100 which is the image processing apparatus of the present invention shown in FIG. 1. Computer 100' is the same kind of portable information terminal as computer 100, and can be connected to memory device 500 shown in FIG. 10B.

Memory device 500 is equipped with memory 502 as shown in FIG. 10B. The memory space within memory 502 is divided into JPEG image storage area 502a and Bayer matrix storage area 502b. Of these, inside Bayer matrix storage area 502b is stored in advance the Bayer matrix described previously.

For example, if a user installs this memory device 500 on a digital camera (not illustrated) and takes a photo using that digital camera, that photo will be stored as a JPEG image in JPEG image storage area 502a within memory 502 of memory device 500. After that, if the user removes memory device 500 from the digital camera and installs it in the designated site of computer 100' as shown in FIG. 10A, memory 502 of memory device 500 will be electrically connected to I/O unit 108 of computer 100'.

Then, if the user wants to print the JPEG image take by a digital camera and stored in memory device 500 on a remote printer via a network, if the user gives instructions to do this via operating unit 110, CPU 102 (noise adding unit 700) reads the target JPEG image from JPEG image storage area 502a in memory 502 of memory device 500, and reads the Bayer matrix from the Bayer matrix storage area 502b. As explained with FIG. 6, noise adding unit 700 obtains noise obtained by performing discrete cosine transformation on the read Bayer matrix and adds that noise to the read JPEG image. Processing after that is the same as the process described previously, so the explanation is omitted here.

Also, memory device 500 shown in FIG. 10 has Bayer matrix storage area 502b inside memory 502, but it is also possible to prepare a noise storage area in place of this Bayer matrix storage area, and to store noise obtained by performing discrete cosine transformation on a dither matrix such as a Bayer matrix or white noise there, and to use this.

As described above, for this variation example, by storing a dither matrix used when adding noise or storing the noise itself in memory device 500 for storing JPEG images, noise can be added easily without preparing such a dither matrix or noise in computer 100'.

(5) Structure of a Second Preferred Embodiment

Figure 11:
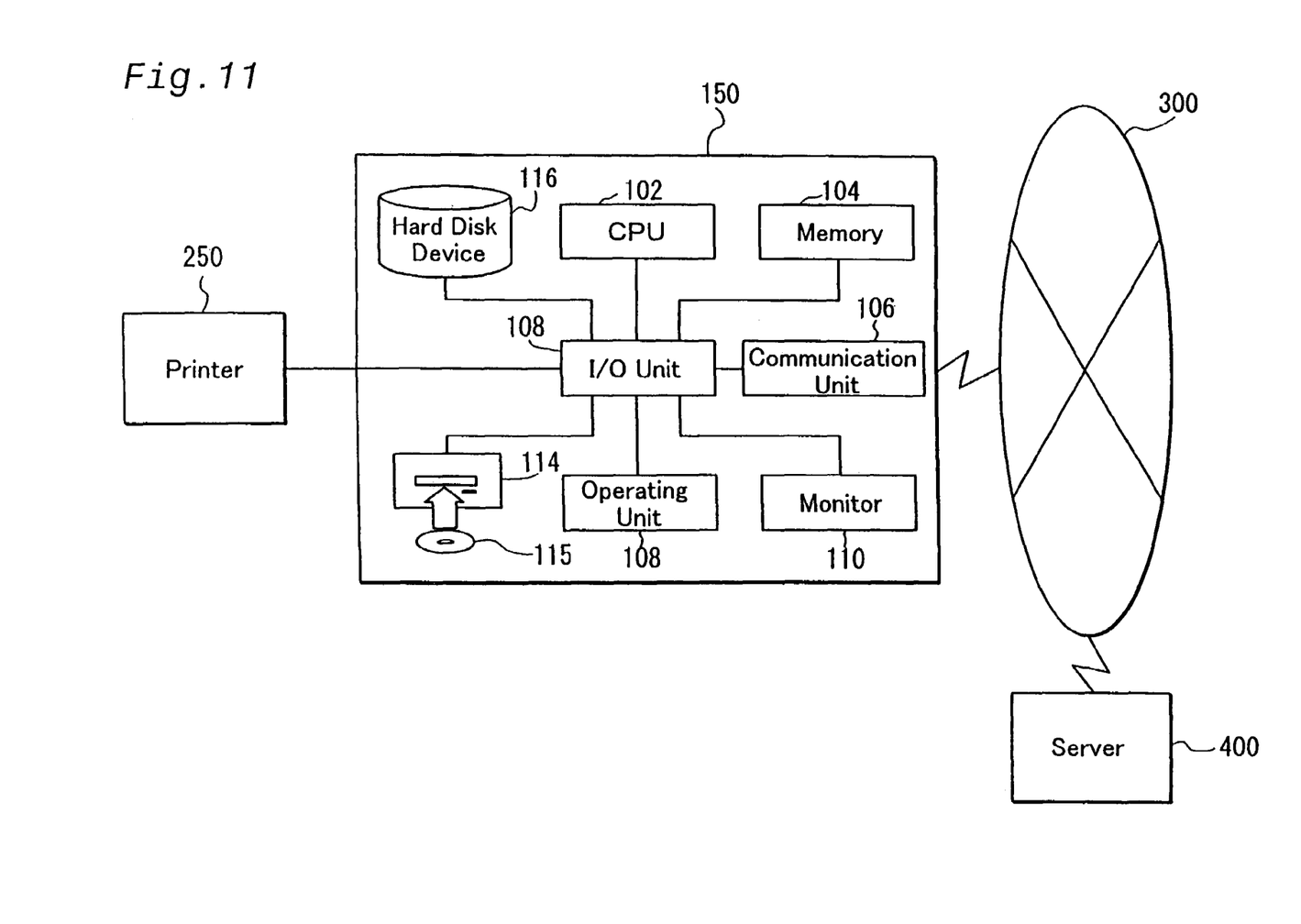
FIG. 11 is a block diagram showing the summary structure of an image processing apparatus as a second preferred embodiment of the present invention.

FIG. 11 is a block diagram showing the summary structure of an image processing apparatus as a second preferred embodiment of the present invention.

Computer 150 shown in FIG. 11 constitutes the image processing apparatus of the present invention, and a typical printer 250 is directly connected on the outside of this. Computer 150 is connected to network 300 the same as computer 100 shown in FIG. 1.

Computer 150 can be, for example, a notebook type personal computer and is equipped with, as with computer 100 shown in FIG. 1, a CPU 102, memory 104, I/O unit 108, operating unit 110, monitor 112, communication unit 106, and also is equipped with a hard disk device 116 for storing large volumes of things like JPEG images as well as storing the computer program to be described later, and is equipped with CD-ROM drive device 114.

The computer program that runs CPU 102 is recorded in memory 104 as with the preferred embodiment shown in FIG. 1. However, with the preferred embodiment shown in FIG. 1, the computer program is recorded in ROM or writable non-volatile memory in memory 104, while with this preferred embodiment, the computer program is provided in a form recorded in recording medium CD-ROM 115, and by being read by CD-ROM drive device 114, is fetched into computer 150. Then, the fetched computer program is transferred to hard disk device 116, after which it is transferred to memory 104 at startup time or the like, and of memory 104, is recorded in RAM. Or, the read computer program can be transferred directly to memory 104 without going through hard disk device 116.

In this way, with this preferred embodiment, we described using a CD-ROM as a recording medium that can be read by a computer and that records a computer program, but besides this, it is possible to use a variety of media that can be read by a computer such as floppy disks, optical electromagnetic disks, IC cards, ROM cartridges, punch cards, printed matter printed with code such as bar codes, computer internal memory devices (memory such as RAM), and external memory devices.

Also, the computer program, besides being provided in this form recorded on this kind of recording medium, can also be fetched into the computer from a program server by accessing the program server (not illustrated) that supplies the computer program via a network 300.

Also, part of the aforementioned computer program can be constituted by the operating system program.

(6) Operation of the Second Preferred Embodiment

Now we will explain the operation of this preferred embodiment. In FIG. 11, multiple JPEG images downloaded from server 400 are already stored in hard disk device 116.

Here, when the user wants to print a downloaded JPEG image on a printer 250 directly connected to computer 150, when he gives instructions to do this via operating unit 110, CPU 102 processes the JPEG image as described hereafter.

Figure 12:
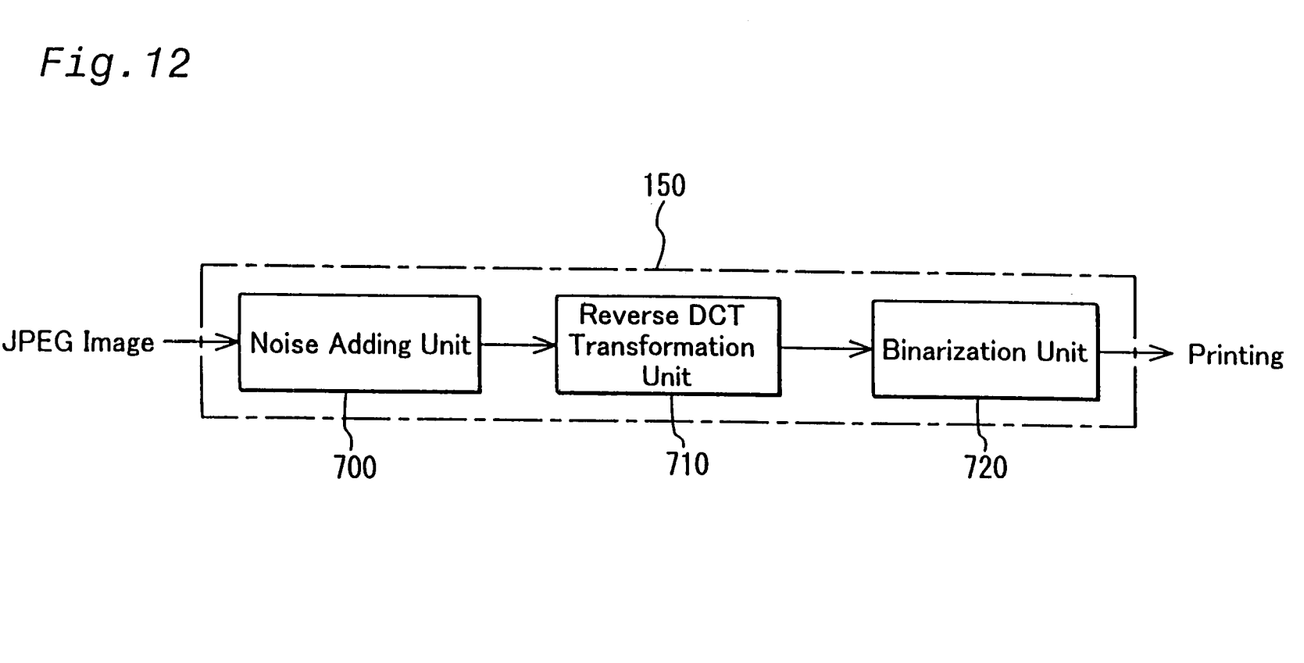
FIG. 12 is a block diagram showing an image processing block equipped with the computer 150 of FIG. 11.

FIG. 12 is a block diagram showing an image processing block equipped with computer 150 of FIG. 11. With the preferred embodiment shown in FIG. 1, printer 200 was equipped with reverse DCT transformation unit 710 and binarization unit 720, but with this preferred embodiment, as shown in FIG. 12, in addition to noise adding unit 700 there is also reverse DCT transformation unit 710 and binarization unit 720 in computer 150. In other words, CPU 102 functions as noise adding unit 700 according to the computer program recorded in memory 104, and also functions as reverse DCT transformation unit 710 and binarization unit 720.

Noise adding unit 700 that functions according to CPU 102 reads the downloaded target JPEG image from hard disk device 116, and adds designated noise to that JPEG image. The method of adding noise to the JPEG image is the same as for the preferred embodiment shown in FIG. 1, so the explanation is omitted here.

Next, reverse DCT transformation unit 710 that functions according to CPU 102 performs reverse discrete cosine transformation on the noise-added JPEG image, and expands it to spatial coordinates.

Next, binarization unit 720 that functions according to CPU 102 reads the set threshold value prepared in memory 104 in advance, sequentially compares each pixel value of the image expanded to spatial coordinates with the set threshold value, and binarizes these. As a result, a half-tone processed image is obtained.

After that, CPU 102 adds a print control command to the half-tone processed image and sends it to the externally connected printer 250. Printer 250 prints the input image onto desired printer paper according to that added print control command.

As explained above, with this preferred embodiment, noise is added to a JPEG image at computer 150, and by performing reverse discrete cosine transformation on that noise-added JPEG image and binarizing it using a set threshold value, one full series of half-tone processing is performed within computer 150.

Therefore, with computer 150, all that is done is noise is added at the space frequency, that JPEG image is expanded, and this is binarized at a set threshold value without expanding the JPEG image to spatial coordinates, so the burden of computer 150 on CPU 102 is very light, and processing time is short.

However, with the above explanation, the JPEG image to which noise was added by noise adding unit 700 underwent reverse discrete cosine transformation by reverse DCT transformation unit 710 and was binarized by binarization unit 720, but it is also possible to save the image as is with noise added.

Specifically, this is performed by CPU 102, after noise is added to the JPEG image, storing that image in hard disk device 116 via I/O unit 108 or by writing it to CD-ROM 115 using CD-ROM drive device 114.

For example, when a noise-added JPEG image is written to CD-ROM 115, it is possible to take that CD-ROM 115 to another image processing apparatus, and at that image processing apparatus, to read the written image, and by performing reverse discrete cosine transformation and binarization processing, to obtain a half-tone processed image using another image processing apparatus.

Also, by saving a data compressed JPEG image as is, less recording area is required for saving.

The present invention is not limited to the aforementioned preferred embodiments and aspects, and can be implemented in a variety of forms without straying from the key scope of the invention.

For the aforementioned preferred embodiments, we explained an example when an image was printed by a printer, but the present invention is not limited to this, and, for example, can be used for displaying an image on a monitor, etc. For example, when computer 100 is a portable information terminal as described in FIG. 1, we cannot expect a high performance device as the built in monitor 112. For example, even if the monitor 112 is a color monitor, when each gradation of the R component, G component, and B component is two gradations each, to display a multi-gradation image in two gradations, as with a printer, half-tone processing of the image is necessary. Therefore, when displaying a JPEG image on this kind of monitor, if the present invention is used, the same effect as when printing with a printer can be achieved.

Also, with the aforementioned preferred embodiments, the subjects were JPEG images, but the present invention is not limited to JPEG images, and can be used as long as the image has undergone normal orthogonal transformation. Specifically, JPEG images are images that have undergone discrete cosine transformation, but the invention can be applied even with other images that have undergone normal orthogonal transformation. As other normal orthogonal transformations, various transformation such as discrete Fourier transformation, Walsh Adamar transformation, slant transformation, and discrete sine transformation can be used.

Also, with the aforementioned preferred embodiments, for the binarization process a set threshold value was used and each pixel value of an expanded image was compared with that set threshold value, and then binarization was done, but the present invention is not limited to that, and it is possible to change the threshold value for each pixel value of an image, compare the pixel value with the changed threshold value, and then perform binarization.

Also, with the aforementioned preferred embodiments, the finally obtained image was a binarized image, but the present invention is not limited to this, and it is possible to obtain a final image that is made a base three processed, base four processed, or processed to a multi-value base greater than that. Specifically, the following two methods can be considered.

As a first method, when performing binarization processing, two or more different threshold values can be prepared, each pixel value of the image can be compared with these threshold values, and multi-value processing can be done.

As a second method, when adding noise, two or more different dither matrixes can be prepared, each undergoes discrete cosine transformation, and the respective noises can be obtained, while at the same time two or more of the same target JPEG images can be prepared, the obtained noise can be added to each JPEG image, and after each JPEG image undergoes reverse discrete cosine transformation, each image is binarized using a set threshold value, and the finally obtained image has undergone multi-value processing.

In the aforementioned variation example (variation example shown in FIG. 10), there was a JPEG image storage area 502a and Bayer matrix storage area 502b in memory 502 of memory device 500, but it is also possible to provide another area for storing other information. For example, if it is possible to perform color matching processing at the computer connected to that memory device, a color matching table storage area could be further provided in memory 502, and a color matching table could be stored there and used when performing the aforementioned color matching.

Also, with the aforementioned preferred embodiments, color images were the subjects, but of course it is also possible to use the invention for black and white images.

With the aforementioned preferred embodiments, we explained an example with a portable information terminal or notebook type personal computer used as the computer, but it is also possible to use various computers such as desktop personal computers or workstations, and various peripheral equipment that essentially have a computer function such as printers, copiers, scanners, or digital cameras, or various types of home or work equipment that similarly have a computer functions such as an audio set, video set, or set top box.

What is claimed is:

1. An image processing apparatus that performs designated processing on an image for which high frequency components have been removed, said image processing apparatus comprising:

a memory unit configured to store a predetermined designated noise;

a noise adding unit configured to receive the predetermined designated noise from the memory unit and configured to add the predetermined designated noise to the image with said high frequency components removed, wherein the predetermined designated noise is generated by discrete cosine transformation of a dither matrix.

2. A computer program product that causes a computer to perform designated processes on a normal orthogonally transformed image, said computer program product comprising:

a first program code that causes said computer to add non-random designated noise to said image that has undergone said normal orthogonal transformation;

a second program code that causes said computer to perform a reverse normal orthogonal transformation, which is a reverse transformation of said normal orthogonal transformation, on said noise-added image;

a third program code that causes said computer to binarize said image, which has undergone said reverse normal orthogonal transformation, using a designated threshold value; and a computer readable medium, in which said first program code, said second program code, and said third program code are stored.

3. The computer program product of claim 2, wherein the first program code further causes the computer to generate the non-random designated noise based on a dither matrix.

4. The computer program product of claim 2, wherein the first program code further causes the computer to retrieve the non-random designated noise from a memory unit.

* * * * *